United States Patent [19]

Monroy

[11] Patent Number: 4,942,746
[45] Date of Patent: Jul. 24, 1990

[54] ANTI-THEFT AUTO LOCKING DEVICE WITH SPRING CLUTCH

[76] Inventor: Jacob G. Monroy, 4143-A Warner Blvd., Burbank, Calif. 91505

[21] Appl. No.: 422,767

[22] Filed: Oct. 17, 1989

[51] Int. Cl.$^5$ ............................................. E05B 65/12
[52] U.S. Cl. ........................................ 70/238; 70/261
[58] Field of Search ................................. 70/198–203, 70/211–214, 237–239, 247, 254, 261

[56] References Cited

U.S. PATENT DOCUMENTS

| | | |
|---|---|---|
| 1,423,955 | 7/1922 | Miller . |
| 1,494,717 | 5/1924 | Sell . |
| 1,862,715 | 6/1932 | Solliday et al. . |
| 2,733,089 | 1/1956 | Grevengoed . |
| 3,245,239 | 4/1966 | Zaidener . |
| 3,262,292 | 7/1966 | Glass . |
| 3,423,968 | 1/1969 | Foote . |
| 3,462,982 | 8/1969 | Moore . |
| 3,504,405 | 4/1970 | Elliott-Smith . |
| 3,550,409 | 12/1970 | Pariser . |
| 3,650,347 | 3/1972 | Campos . |
| 3,664,164 | 5/1972 | Zaidener . |
| 3,690,131 | 9/1972 | Davis . |
| 3,874,480 | 4/1975 | Porter et al. . |
| 3,898,823 | 8/1975 | Ludeman . |
| 4,201,390 | 5/1980 | Meier ................................ 70/238 |
| 4,208,026 | 6/1980 | Reynolds . |
| 4,438,964 | 3/1984 | Peters . |
| 4,696,172 | 9/1987 | Farrow . |
| 4,699,238 | 10/1987 | Tamir . |
| 4,730,470 | 3/1988 | Zane ................................ 70/238 |
| 4,732,418 | 3/1988 | Crown et al. . |
| 4,738,127 | 4/1988 | Johnson . |
| 4,747,279 | 5/1988 | Solow . |
| 4,835,999 | 6/1989 | Chant ................................ 70/238 |

FOREIGN PATENT DOCUMENTS

| | | |
|---|---|---|
| 2735782A1 | 11/1978 | Fed. Rep. of Germany . |
| 997868 | 7/1965 | United Kingdom . |
| 1223123 | 2/1971 | United Kingdom . |
| 2080873 | 2/1982 | United Kingdom . |
| 2142889 | 1/1985 | United Kingdom . |

OTHER PUBLICATIONS

P. L. Porter Co., Advertising Leaflet: Mechlok—Single or Dual Linear Locking Device with Remote Control, undated.
P. L. Porter Co., Advertising Leaflet: Double-Lok—Single Linear Locking Device with Remote Control, undated.
P. L. Porter Co., Advertising Leaflet: 5 Lever–Modular Control Panel, undated, 10 Way—Seat Adjust System.
P. L. Porter Co., "Mechlok", Drawing Nos. MM65-1004, 1012, 1016 and 1051, 1986–87.

*Primary Examiner*—Robert L. Wolfe
*Attorney, Agent, or Firm*—Edward B. Anderson

[57] ABSTRACT

Two hooks are adjustable in position along a cylindrical bar for engaging operating elements in a vehicle, thereby preventing operation of the vehicle. One hook is fixed to an end of the bar. The other hook includes a yoke having arm ends pivotable about the bar. A lock body is captured between the yoke arm ends for pivoting about the bar. A spring wound under tension on the bar has one end attached to the yoke and the other end attached to the lock body. Pivoting of the lock body relative to the yoke, releases the spring, allowing sliding of the hook along the bar. A lock is mounted on the lock body for securing the lock body in a position in which the spring is under tension on the bar, thereby preventing movement of the hook along the bar.

6 Claims, 2 Drawing Sheets

ANTI-THEFT AUTO LOCKING DEVICE WITH SPRING CLUTCH

FIELD OF THE INVENTION

This invention relates to devices for inhibiting the theft of vehicles. More particularly, it relates to devices for locking a vehicle-operating mechanism in the driver's compartment to prevent operation of the vehicle.

BACKGROUND AND SUMMARY OF THE INVENTION

Because of the commercial value and prevalence of automobiles, numerous ones are stolen for resale, use of parts or other reasons. Many devices have been developed in an attempt to prevent such thefts. The most basic of these is the use of an ignition key for operating the vehicle. However, those skilled in unauthorized use become proficient in "hot wiring" vehicles so that the key is not needed.

Other mechanisms have also been developed in order to compound the inconvenience of theft. Contemporary cars now include a steering wheel locking mechanism that is activated by removal of the ignition key. Other devices include telescoping arms with hooks at opposite ends. One hook is placed over a clutch, brake or throttle pedal support rod and the other over the steering wheel rim. A locking mechanism fixes the two telescoping arms in a fixed position.

These latter devices tend to be very cumbersome in that they are positioned under the steering wheel, can be difficult to install, and are hidden from view until the door is opened. Further, once the device is locked, the two telescoping arms cannot be adjusted. It is thus necessary to hold the two arms in a desired position while they are locked. This can be difficult to do with only two hands.

Another type of deterrent has been the use of a loop strap mounted to the rear cushion of the driver's seat. This strap is then fastened to the steering wheel with the seat tilted forward in order to prevent the wheel from being rotated and to prevent a driver from getting into the driver's seat. Such a device is described in German patent No. DE 27 35 782 A1 assigned to Kummli. Such a device, however, has a fixed strap length customized for each installation and requires physically mounting it onto the seat back framework which varies by make of vehicle.

The following patents provide an overview of some of the devices that people have created to prevent theft, such as of a vehicle: U.S. Pat. Nos. 1,423,955 issued to Miller; 1,494,717 issued to Sell; 3,245,239 issued to Zaidener; 3,262,292 issued to Glass; 3,423,968 issued to Foote; 3,462,982 issued to Moore; 3,504,405 issued to Elliott-Smith; 3,550,409 issued to Pariser; 3,650,347 issued to Campos; 3,664,164 issued to Zaidener; 3,690,131 issued to Davis; 4,208,026 issued to Reynolds; 4,696,172 issued to Farrow; 3,898,823 issued to Ludeman; 4,699,238 issued to Tamir; 4,738,127 issued to Johnson; and 4,747,279 issued to Solow; and British Patent Nos. 997,868 issued to Burton; 1,223,123 issued to Barker; 2,080,873 issued to Grignani; and 2,142,889 issued to Turner et al.

The patents issued to Zaidener, Moore, Tamir, Johnson, Solow, Grignani, and Turner et al. in particular disclose auto anti-theft devices in which a built-in lock is used to release an operating element of the device. However, these devices tend to be somewhat complex, such as involving cam operations, and ratchets for adjustment on a specially tooled bar.

Springs are also known for use in latching things together, such as cupboard doors, auto doors and screen doors. Representative of such uses are U.S. Pat. Nos. 1,862,715 issued to Solliday et al.; 2,733,089 issued to Grevengoed; 4,438,964 issued to Peters; and 4,732,418 issued to Crown et al. These all disclose the use of springs to bias a latching mechanism toward a predetermined position. These devices are effective only in securing two parts together in a single position, rather than making one part positionable along an extended portion of another part.

The present invention overcomes these disadvantages of the prior art. In particular, the present invention provides a device that is easy to use, simple to manufacture, prevents operation of a vehicle in which it is installed, and is readily visible from outside the vehicle, to further deter breaking into the vehicle.

Generally speaking, the invention provides a device for preventing the theft of a vehicle having a driver's compartment with a first member movable for operation of the vehicle and a second member spaced from the first member. The device comprises a first engaging element for securely engaging the first member and a second engaging element for securely engaging the second member. A bar is fixedly attached to the first element and has a length sufficient to extend between the first and second members. A spring is disposed around the bar and has first and second spring ends, the first spring end being attached to the second element in a manner preventing rotation of the first spring end about the bar relative to the second element. A lock mechanism locks the second spring end in a securing position relative to the first spring end whereby the spring is under tension around the bar, thereby frictionally inhibiting movement of the spring along the bar. The lock mechanism is operable for releasing the spring from the securing position and allowing rotation of the second spring end around the bar relative to the first spring end sufficient to remove the tension of the spring on the bar. This allows movement of the spring, and therefore the second element along the bar.

In the preferred embodiment, the invention provides a device for preventing the theft of a vehicle having a steering wheel and a back seat cushion associated with the steering wheel, which seat cushion has a head restraint attached to the top of the seat cushion by an elongate support member. The device comprises a first hook securely engageable with the steering wheel, and a second hook securely engageable with the support member. A cylindrical bar is fixedly attached to the first hook.

The second hook includes a yoke extending around a lock body. The yoke has arm ends captured slidingly on the bar. The lock body is also captured slidingly on the bar between the yoke arm ends. A spring is positioned around the bar with one end fixed rotationally to one yoke arm end. The other spring end is fixed rotationally to the lock body.

The lock body is also rotatable relative to the yoke between a securing position, in which the spring is under tension on the bar, and a releasing position, in which the spring is not under tension on the bar. In the securing position, the spring cannot be manually moved along the bar. In the releasing position, the spring, and therefore the yoke, second hook and lock body may readily be moved along the bar. The lock body also is lockable in the securing position relative to the yoke for preventing movement of the second hook along the bar, and therefore, relative to the first hook.

The spring and bar mechanism of the present invention is referred to variously as a spring clutch or friction brake, such as is disclosed in U.S. Pat. No. 3,874,480 issued to Porter et al. Such mechanisms are available from P. L. Porter Co. of Los Angeles, Calif. for use particularly in seat adjustment devices. Such devices are referred to under the proprietary names of MECHLOK TM, DOUBLE-LOK TM, and 10 WAY-5 LEVER TM.

It will thus be appreciated that the invention provides a device that prevents or discourages the theft of a vehicle. It is key operated and may be used to secure a steering wheel to the support member of a head rest on the rear cushion of the driver's seat. When the seat is pivoted forward, it rests against the steering wheel. In this position the seat is secured against the steering wheel. A would-be thief is prevented from occupying the driver's seat and from further tampering with the ignition or the steering column lock. Further, the steering wheel cannot be turned, thereby preventing the vehicle from being driven. It is also highly visible through the car windows, and thereby serves as a visual deterrent as well.

These and other features and advantages of the present invention will become apparent from a review of the drawings and the following detailed description of the preferred embodiment.

BRIEF DESCRIPTION OF THE DRAWINGS

Fig a perspective view from the rear of a drivers seat showing a lock device made according to the present invention installed in a vehicle.

DETAILED DESCRIPTION OF THE PREFERRED EMBODIMENT

Figure 1:
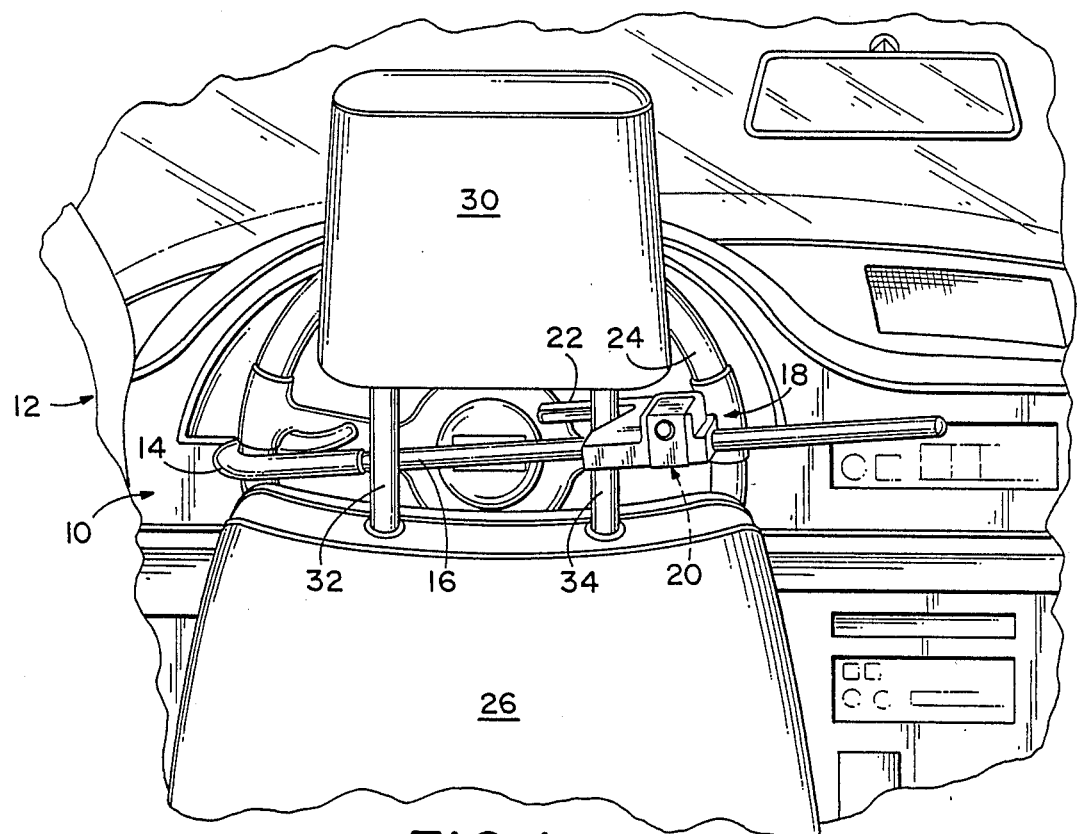
Figure 2:
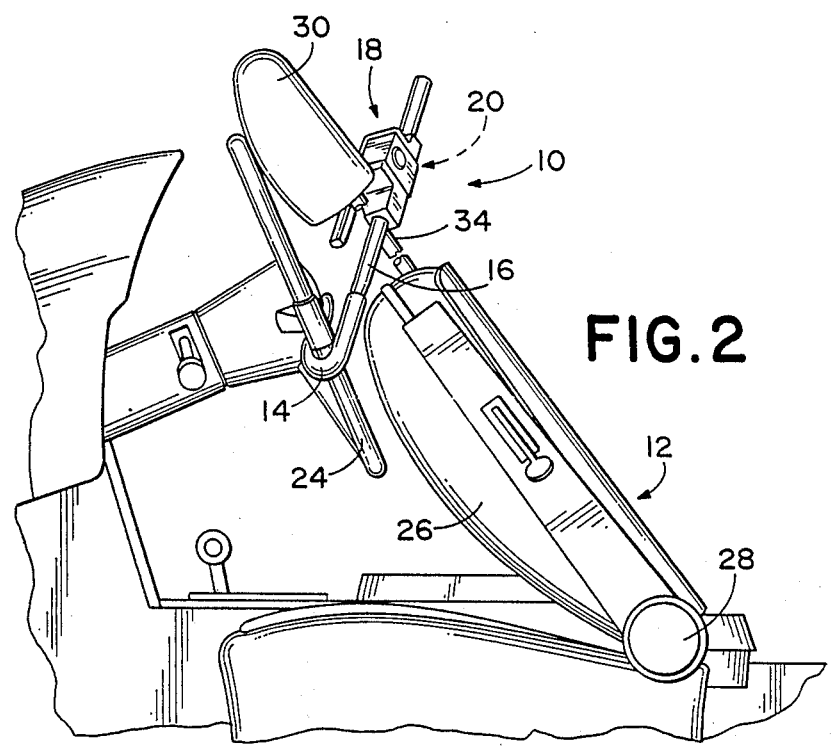
FIG. 2 is a side view of the device and vehicle of FIG. 1.

Referring initially to FIGS. 1 and 2, an anti-theft device 10 made according to the invention is shown installed in a vehicle 12. Apparatus 10 includes a hook 14 positioned on one end of an elongate cylindrical bar 16. It is preferable that hook 14 be coated with a nonmarring plastic sleeve. A clamp assembly 18 is captured on bar 16 and is movable along the bar by a spring clutch mechanism 20 contained within assembly 18. Assembly 18 has a hook 22 also preferably coated with a nonmarring plastic sleeve. A clamp assembly 18 is captured on bar 16 and is movable along the bar by a spring clutch mechanism 20 contained within assembly 18. Assembly 18 has a hook 22 also preferably coated with a nonmarring plastic.

Hook 14 captures the rim of a steering wheel 24 of the vehicle. A driver's seat back cushion 26 is hinged at pivot 28 and has a head rest 30 connected to cushion 26 by generally circular support rods 32 and 34. Alternatively, the head rest is sometimes attached to the seat cushion by a single, generally rectangular cross section rod, also accommodated by hook 22.

Hook 14 may be placed around either of rods 32 and 34 and may be placed around any portion of the steering wheel. Although shown for clarity attached to the left of the steering wheel and to the right rod 34, as viewed in FIG. 1, it is preferable to connect one of the support rods to the closest point on the wheel. In other words, hook 22 is preferably connected to rod 32 when hook 14 is connected to the left side of the steering wheel.

Figure 3:
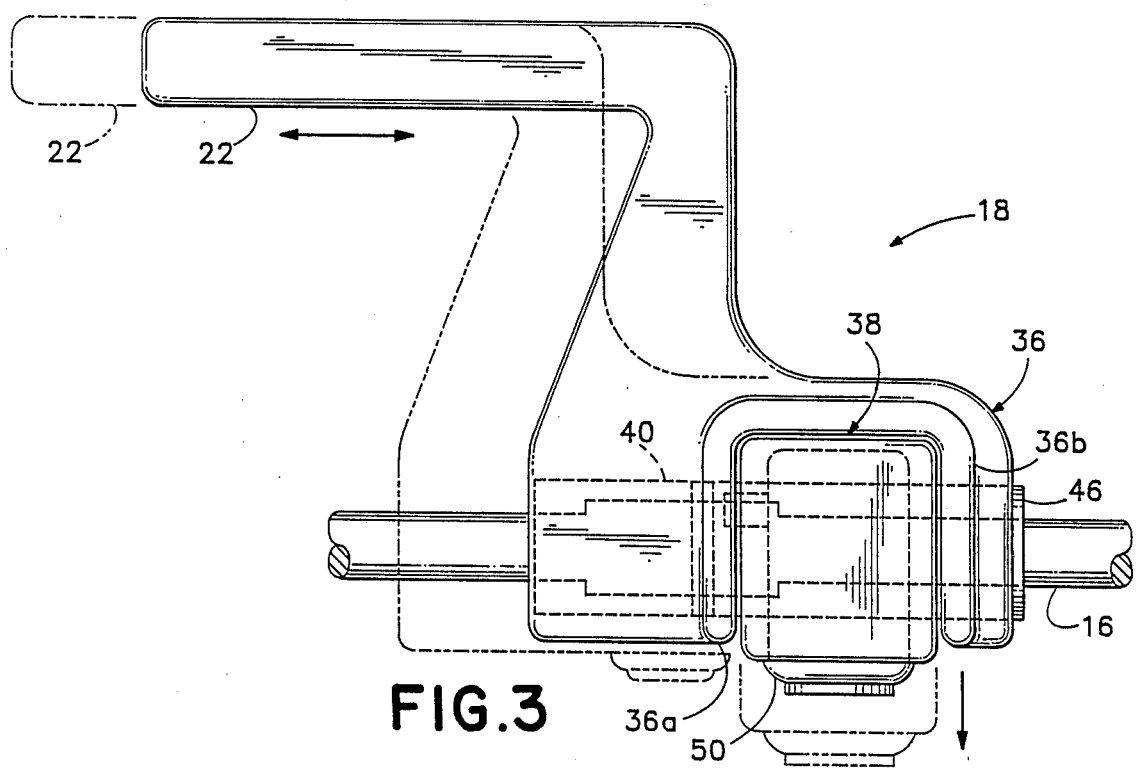
FIG. 3 is a top view of the operative portion of the device of FIG. 1.
Figure 4:
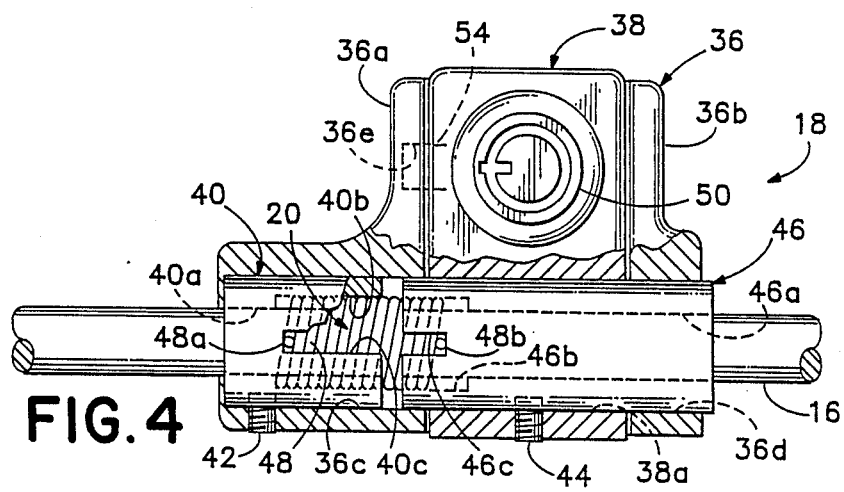
FIG. 4 is a view from the bottom of the device of FIG. 3.
Figure 5:
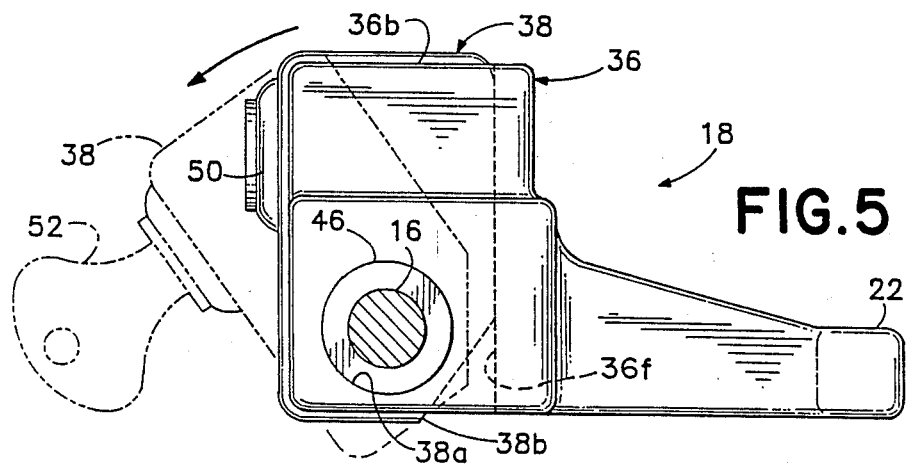
FIG. 5 is a view from the right side of the device of FIG. 3.

FIGS. 3-5 show with increased detail the structure of clamp assembly 18.

It can thus be seen that apparatus 10 made according to the present invention provides a device which secures a back cushion having a head rest supported on a rod against the steering wheel. This apparatus is easy to use, is visible from outside of the vehicle in which it is installed, and effectively prevents operation of a vehicle on which it is installed. Apparatus 10 is also useful for locking a brake or clutch pedal in position relative to the steering wheel. For these applications, the hooks are positioned to capture the steering wheel rim and the pedal arm. Thus, the steering wheel may not be turned and the brake or clutch pedal may not be depressed. This application is particularly useful in cars which do not have a head rest supported on a support rod or one in which the rear seat cushion does not pivot forward toward the steering wheel. Hook 22 is attached to bar 16 by a yoke 36 extending around a lock body 38. Yoke 36 includes arms 36a and 36b, L each with a corresponding passageway 36c and 36d, respectively, through which bar 16 passes. A first spring-retaining sleeve 40 is disposed within passageway 36c and has an inner bore 40a sized to slidingly receive bar 16. Sleeve 40 is secured to arm 36a by suitable means, such as a lock nut 42.

Body 38 has a corresponding passageway 38a in which is secured, by a lock nut 44, a second spring-retaining sleeve 46. Sleeve 46 is sufficiently long to extend from inside passageway 36c adjacent to a corresponding end of sleeve 40, through passageway 38a, and into passageway 36d, as shown. Sleeve 46 also has in inner bore 46a sized to slidingly receive bar 16.

The two adjacent ends of the sleeves also have enlarged bore portions 40b and 46b sized to receive a spring 48 wound around bar 16. These enlarged bores are sufficiently large to allow a slight radial expansion of the spring relative to the bar. Extending longitudinally along the two sleeves from the adjacent ends, are grooves 40c and 46c which receive radially extending opposite spring ends 48a and 48b. Spring end 48a is thus fixed in rotational position to yoke 36, and spring end 48b is fixed in rotational position to lock body 38.

The lock body and yoke are provided with structure to to allow slight counterclockwise pivoting of lock body 38 relative to yoke 36, as shown in FIG. 5 by the lock body in dashed lines. This pivoting is provided in this embodiment by a bevelled edge 38b. This allows clearance between the lock body and the center face 36f of the yoke.

The position of lock body 38 relative to yoke 36 shown in solid lines in the figures is referred to as a securing position in which spring 48 is under tension on bar 16. Preferably, the spring is slightly undersized for the bar so that it is biased toward the securing position. In this position, clamp assembly 18 is secured to the bar so that it cannot be manually moved along the bar.

The position of lock body 38 relative to yoke 36 shown in dashed lines in FIGS. 3 and 5 is referred to as a releasing position in which spring 48 is not under tension on bar 16. Movement of the lock body from the securing position to the releasing position thus unwinds the spring slightly, taking it out of friction contact with the bar. With the lock body in this position, clamp assembly 18, and therefore also hook 22, are freely moveable along bar 16.

In order to fix the position of the lock body relative to the yoke, a lock cylinder 50 operable by a removable key 52 is mounted in the upper portion of the lock body, as viewed in FIG. 4. Cylinder 50 controls the throw of a pin 54 extendable from lock body 38 into a correspondingly sized cavity 36e. With pin 54 in cavity 36e, the lock body and yoke are in the relative securing position.

Anti-theft device 10 is installed in a vehicle by inserting key 52 in key cylinder 50 and turning the key. This causes pin 54 to be retracted from cavity 36e. The lock body is then rocked forward while holding hook 22 to the releasing position shown in FIG. 5. The hooks are then positioned to engage the vehicle steering wheel and head rest support, or other elements as desired, and the lock body released. The spring tension then pulls the lock body back into alignment with the yoke, where the key may be turned to lock the lock body in the securing position. This procedure is simply reversed to remove device 10 from the vehicle.

The present invention can thus be seen to be very easy to use. It is operated with very little pressure, yet holds the hooks with more friction than an unaided individual can overcome. Further, the device is very simple, and therefore economical to make.

While the invention has been described with reference to a preferred embodiment, it will be understood by those skilled in the art that changes may be made in the structure and design of the preferred embodiment without varying from the spirit and scope of the invention as defined in the claims.

We claim:

1. A device for preventing the theft of a vehicle having a driver's compartment with a first member movable for operation of the vehicle and a second member spaced from the first member, said device comprising:
   first engaging means for securely engaging the first member;
   elongate bar means fixedly attached to the first engaging means and having a length sufficient to extend adjacent to the first and second members, the bar means having at least a cylindrical portion posed adjacent the second member when the first engaging means engages the first member;
   second engaging means, captured slidingly on the cylindrical portion of the bar means, for securely engaging the second member;
   spring means disposed around the bar and having first and second spring ends, the first spring end being attached to the second engaging means in a manner preventing rotation of the first spring end about the bar relative to the second engaging means; and
   lock means for locking the second spring end in a securing position relative to the first spring end whereby the spring means is under tension around the bar, thereby frictionally inhibiting movement of the spring means along the bar, the locking means being operable for releasing the spring means from the securing position and allowing rotation of the second spring end around the bar relative to the first spring end sufficient to remove the tension of the spring means on the bar, thereby allowing movement of the spring means, and therefore the second engaging means, along the bar.

2. A device according to claim 1 wherein the lock means includes a body member having a passageway in which the spring means and bar extend, with the second spring end being fixed in rotational position relative to the body member.

3. A device according to claim 2 wherein the body member is lockable in a securing position relative to the second engaging means corresponding to the securing position of the second spring end relative to the first spring end.

4. A device according to claim 3 wherein the second engaging means includes a yoke extending around the body member with each end of the yoke attached slidably on the bar.

5. A device according to claim 1 wherein the second engaging means further comprises first sleeve means and the lock means further comprises second sleeve means, each sleeve means having an enlarged passageway sized to receive the spring means, and a reduced passageway sized to prevent movement of the spring therethrough.

6. A device according to claim 5 wherein each of the first and second sleeve means has a longitudinal groove for receiving a corresponding one of the first and second spring means ends.

* * * * *